United States Patent [19]

Popjoy et al.

[11] Patent Number: 5,404,972

[45] Date of Patent: Apr. 11, 1995

[54] SELF-BLOCKING GAS SPRING WITH TEMPERATURE-RESPONSIVE BYPASS VALVE

[75] Inventors: Mark A. Popjoy, Lansdale; Paul McDonnell, Warrington, both of Pa.

[73] Assignee: Fichtel & Sachs Industries, Inc., Colmar, Pa.

[21] Appl. No.: 291,735

[22] Filed: Aug. 17, 1994

Related U.S. Application Data

[63] Continuation of Ser. No. 56,257, Apr. 30, 1993, abandoned.

[51] Int. Cl.⁶ .............................. F16F 9/52; F16F 5/00
[52] U.S. Cl. .................................. 188/277; 267/64.11; 188/322.22; 236/93 R
[58] Field of Search ................. 188/276, 277, 322.22; 267/64.11, 64.23, 120, 124; 236/93 R, 101 E

[56] References Cited

U.S. PATENT DOCUMENTS

| | | | |
|---|---|---|---|
| 2,815,099 | 12/1957 | Muller et al. | 188/277 |
| 2,899,023 | 8/1959 | Rumsey | 188/277 |
| 3,532,193 | 10/1970 | Kaiser. | |
| 3,791,494 | 2/1974 | McNally | 188/277 |
| 3,792,494 | 2/1974 | Matkan et al. | |
| 3,958,672 | 5/1976 | Keilholz | 188/277 |
| 4,408,751 | 10/1983 | Dodson et al. | 188/277 X |
| 5,106,065 | 4/1992 | Staton et al. | 188/277 X |
| 5,282,609 | 2/1994 | Kuze | 188/277 X |

FOREIGN PATENT DOCUMENTS

| | | | |
|---|---|---|---|
| 1100295 | 9/1955 | France. | |
| 3140007 | 4/1983 | Germany | 188/276 |
| 3605207 | 8/1987 | Germany. | |
| 3605208 | 8/1987 | Germany. | |

Primary Examiner—Robert J. Oberleitner
Assistant Examiner—Kevin D. Rutherford
Attorney, Agent, or Firm—Brumbaugh, Graves, Donohue & Raymond

[57] ABSTRACT

A gas spring comprises a first bypass with a one-way valve that allows fluid to bypass the piston when the piston moves outward and a second bypass with a temperature-compensating spring-biased one-way valve that allows fluid to bypass the piston when the piston is pushed inward with a force exceeding the total of the force due to the gas pressure of the gas spring and the force required to open the spring-biased valve. Variations due to temperature changes in the force required to retract the gas spring are minimized.

4 Claims, 3 Drawing Sheets

SELF-BLOCKING GAS SPRING WITH TEMPERATURE-RESPONSIVE BYPASS VALVE

This application is a continuation of application Ser. No. 08/056,257, filed on Apr. 30, 1993, now abandoned.

BACKGROUND OF THE INVENTION

Gas springs are widely used to counterbalance the engine compartment hoods, trunk lids, rear windows, and tailgates of passenger cars, station wagons, and vans to facilitate opening them and to hold them open at or near a fully open position. It is well known that the force outputs of gas springs vary with the temperature of the gas (Boyle's law); at low temperatures, a gas spring produces a force that is significantly less than the force it produces at high temperatures. It is necessary, therefore, to design the gas spring so that it produces a sufficient force to hold the hood, trunk lid or the like (hereinafter referred to as the "load") open at a suitably selected low temperature, for example, −30° C. (Conventionally, the gas spring is designed to produce a force of about one to five pounds over the load at the hold-open position of the load at, say, −30° C.) At high temperatures, the increase in the force output at the hold-open position may be as much as, say, 50 pounds, which means that the force required to move the load from the hold-open position toward closed ("handle load") is 50 pounds. A handle load of that magnitude is obviously undesirable.

U.S. Pat. No. 5,106,065 (Staton, Apr. 21, 1992), which is owned by the assignee of the present invention, describes and shows a gas spring that incorporates a bypass having a spring-biased valve that prevents fluid flow past the piston from the closed end to the rod seal end of the chamber until a predetermined force due to a pressure differential is applied across the piston and a bypass having a thermostatic valve, which opens at a predetermined temperature and permits fluid in the chamber to flow past the piston from the closed end to the rod seal end of the chamber. When the thermostatic valve is closed, the spring-biased valve provides a hold-open force that is combined with the force due to the gas pressure to hold the gas spring against a load (handle load). When the thermostatic valve is open, the hold-open force of the gas spring is that due to the gas pressure alone, inasmuch as the fluid flows across the piston through the bypass with the thermostatic valve.

The gas springs disclosed in U.S. Pat. No. 5,106,065 provide a significant improvement over prior art gas springs in that the variation of the handle load due to temperature changes is considerably reduced. On the other hand, they do not eliminate variations in the handle load, inasmuch as they do not prevent changes in the handle load as functions of temperature but merely establish two ranges of handle loads, a low temperature range in which the thermostatic valve is closed and the spring-biased valve contributes a force increment opposing the handle load and a high temperature range in which that force increment is not applied, the fluid flowing past the piston through the bypass with the then open thermostatic valve. In each range, the force on the rod due to gas pressure varies as a function of the gas pressure changes due to temperature changes. At the high end of each of the two ranges, the force of the gas spring resisting the handle load is considerably higher than it is at the low end.

SUMMARY OF THE INVENTION

An object of the present invention is to provide a gas spring in which variations in the force of the gas spring resisting the handle load due to gas pressure changes resulting from temperature changes are minimized; i.e., the force of the gas spring resisting the handle load remains generally constant over part or all of the operating range of the gas spring. The present invention is, in particular, an improvement in a gas spring of the type having a spring-biased check valve or a temperature-responsive snap check valve that closes a bypass across the gas spring piston against fluid flow from the closed end compartment to the rod seal end compartment. In a gas spring of this type, the force of the gas spring opposing closing of the load is the total of the force due to gas pressure acting on the piston rod (the normal gas spring output force) and a force required to cause the spring-biased valve to open.

There is provided, in accordance with the present invention, a gas spring having a cylinder member defining a chamber, a closure at one end of the cylinder, a piston rod received in sealed relation to the cylinder member at the other end of the cylinder member and movable toward and away from the closure, and a piston affixed to the piston rod within the chamber. A sealing ring carried by the piston forms a seal with the cylinder. The sealing ring, together with the valves in the bypasses according to the present invention, separates the chamber into an inward compartment adjacent the closed end and an outward compartment adjacent said rod seal end, the volumes of the compartments varying in accordance with the position of the piston. The chamber contains a liquid and a gas under a pressure higher than atmospheric pressure. A first bypass allows the liquid and gas to flow from the outward compartment to the inward compartment when the piston and rod move in the direction of the outward compartment in response to the gas pressure forces imposed on the rod in the outward direction. A one-way valve closes the first bypass to prevent flow of gas and liquid therethrough from the inward compartment to the outward compartment when the rod and piston are moved toward the closure. A second bypass permits the gas and liquid to flow from the inward compartment to the outward compartment upon movement of the rod toward the closure, and a spring-biased one-way valve associated with the second bypass prevents flow therethrough in the absence of a predetermined pressure difference between the liquid and gas in the inward and outward compartments.

The improvement, according to the invention, is the provision of a bimetallic temperature-responsive spring operatively associated with the second bypass valve such as to impart a biasing force on the second bypass valve that varies as a function of the temperature of the gas in the chamber and compensates for variations in the pressure of the gas due to changes in the gas temperature and thereby minimizes variations in the force acting on the rod in a direction to resist movement of the rod toward the cylinder end closure upon application of a handle load.

In some embodiments, the second bypass valve includes a seat and a valve member engageable with the seat in sealed relation, and the bimetallic spring biases the valve member into sealing engagement with the seat with a force that increases as a function of decreases in temperature. A compression spring may be provided in engagement with the bimetallic spring to compensate for tolerance variations and prevent the spring from rattling when it shrinks at high temperatures.

In other embodiments, the second bypass valve includes a seat and a valve member engageable with the seat in sealed relation, a compression spring biases the valve member into sealing engagement with the seat member, and the bimetallic temperature-responsive spring is arranged to oppose the compression spring and impose a force on the valve member in a direction to open it that increases as a function of increases in the temperature of the gas in the chamber.

The effect of the bimetallic spring is to reduce continuously the force acting on the second bypass valve as the gas temperature increases in amounts generally proportionate to the temperature increases and thus offset the increases in the force on the rod due to the gas pressure of the gas spring. At the low end of the operating temperature range of the gas spring, the spring-biased valve of the second bypass contributes a relatively large part of the total hold-open force of the gas spring. At the high end, the contribution of the spring-biased valve of the second bypass to the hold-open force is relatively low or may even be nil. For example, the bimetallic spring may be designed to be inactive above a certain temperature. At temperatures below a selected value, the force required to open the second bypass valve varies generally linearly. Accordingly, variations in the hold-open force of the gas spring resisting the handle load over the operating temperature range are kept at a minimum.

For a better understanding of the invention, reference may be made to the following description of exemplary embodiments, taken in conjunction with the accompanying drawings.

DESCRIPTION OF THE EMBODIMENTS

Figure 1:
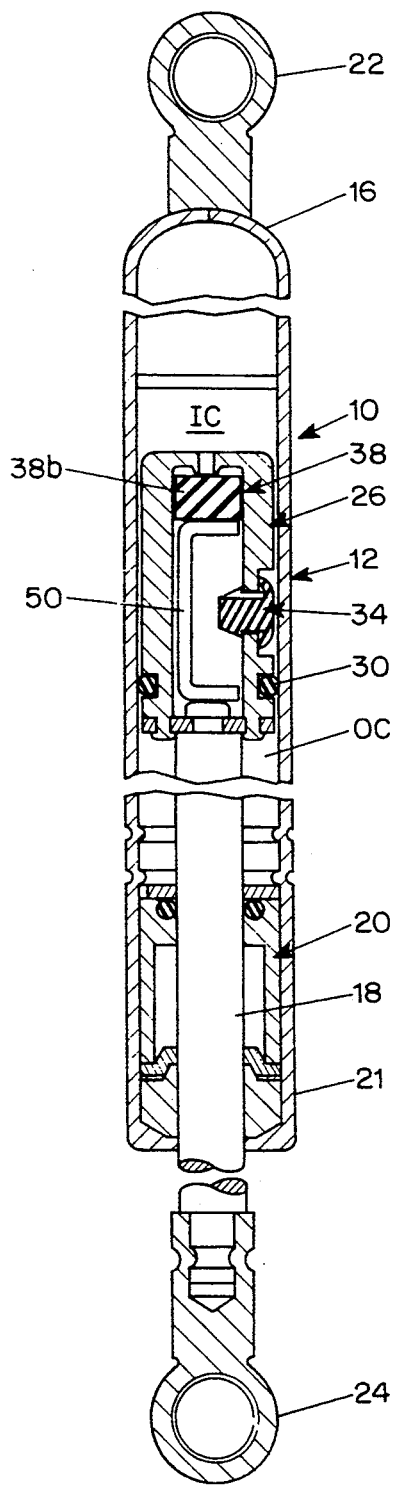
FIG. 1 is an axial cross-sectional view of one embodiment.
Figure 2:
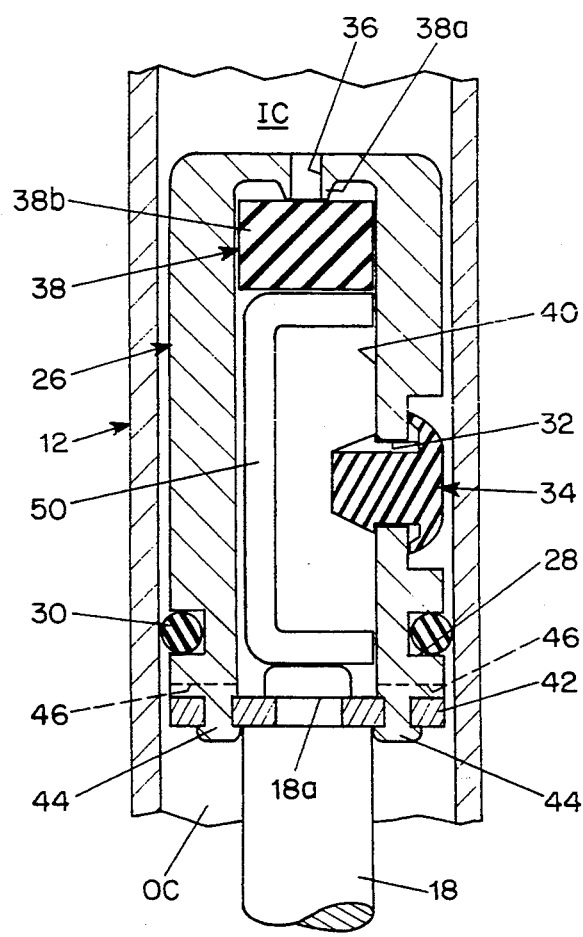
FIGS. 2, 3, and 4 are axial cross-sectional fragmentary views of the piston portion of the embodiment of FIG. 1, showing the stationary mode, rod extension mode and rod retraction mode, respectively.

The gas spring 10 of FIGS. 1 to 4 comprises a circular-cylindrical tube (cylinder) 12 that is closed at one end by a rolled and welded cylinder end closure 16. A piston rod 18 extends into the cylinder 12 through a rod seal assembly 20 in the rod end 21 of the cylinder. Fittings 22 and 24 are fastened to the cylinder end closure 16 and piston rod 18, respectively, for connecting the gas spring to a device, such as a vehicle body, and a load, such as a hood, trunk lid and the like. A piston assembly 26 is fastened to the end of the piston rod within the cylinder 12 and includes a seal and valve-controlled bypasses that divide the chamber within the cylinder into two compartments, the volumes of which vary according to the position of the piston. There is an inward compartment IC between the piston and the cylinder end closure 16 and an outward compartment OC between the piston and the rod seal assembly 20.

The peripheral surface of the piston 26 is in clearance with the inner wall of the cylinder 12. A ring groove 28 receives an elastomeric sealing ring 30 that rides in sealing engagement with the wall of the cylinder 12. Most of the free volume of the cylinder chamber contains air or nitrogen at a pressure of from about 300 to about 4500 psi. The remainder contains a liquid, such as hydraulic brake fluid or mineral oil.

A first bypass that includes a passage 32 having a one-way umbrella check valve 34 allows the gas and liquid in the cylinder chamber to flow from the outward compartment OC to the inward compartment IC when the rod is moving out to lift the load with the force generated by the gas pressure but closes when the load or a handle load applies pressure to fluid in the inward compartment IC and when the rod is moving toward the closed end of the chamber under a handle load. A second bypass that includes a passage 36 and a spring-biased one-way valve 38 is closed when the rod is moving out to lift the load and is also closed when the rod is pushed in under a handle load until the pressure of the gas in the inward compartment IC exceeds the pressure of the gas in the outward compartment OC by an amount sufficient to overcome the force biasing the spring-biased valve closed.

The passages 32 and 36 and the valves 34 and 38 are incorporated into the piston 26, which is generally tubular and has a cavity 40 extending over most of its length that forms part of both bypasses. The piston is attached to a mounting disc 42 by four pins 44 that pass through holes in the disc 42 and are peened over. The disc 42 is affixed to the piston rod 18 by a pin 18a that passes through a hole in the disc and is peened over. Grooves 46 in the face of the piston that abuts the disc permit fluid to flow between the outward compartment OC and the cavity 40 when either one of the bypass valves is open.

The spring that biases the valve 38 to a closed position against its seat 38a at the head of the piston is a bimetallic temperature-responsive spring 50, which is received in the piston cavity 40 and is engaged under compression between the pin portion 18a of the rod 18 and an elastomeric valve member 38b. The spring is designed to provide a force on the valve member 38b that increases generally linearly as a function of decreases in its temperature. Accordingly, as the temperature of the gas in the gas spring decreases and the output force of the gas spring decreases commensurately, the force applied to the valve member 38b by the bimetallic spring 50 increases.

After the user lifts the load, assisted by the gas spring force, and releases the load, the load will fall a short distance, and the rod and piston will move into the cylinder toward the closed end far enough to create a pressure difference between the inward and outward compartments, the pressure in the inward compartment IC being greater than that in the outward compartment OC. The design of the spring-biased valve 38 is such that the pressure difference caused by the load at low temperatures is not enough to open it, and the load will be held open under the combined force on the piston and rod due to the gas pressure and the pressure difference across the piston. In the hold-open position (FIG. 2), fluid flow from the inward compartment IC into the outward compartment OC through the first bypass is prevented by the one-way bypass valve 34.

When the user applies a handle load to close the load, the pressure difference across the piston will increase until it is large enough to open the spring-biased valve 38, thereby allowing the gas and liquid to flow through the second bypass from the inward compartment into the outward compartment as the rod and piston move toward the closed end of the cylinder and the load is closed.

Because the pressure difference required to open the bypass valve 38 decreases generally linearly as a function of increasing temperature while the force on the rod due to gas pressure increases substantially linearly as a function of increasing temperature, the respective changes in the two forces that combine to support a handle load tend to offset each other. Accordingly, the spring-biased valve 38 compensates for variations in the pressure of the gas due to changes in the gas temperature and thereby minimizes variations in the force acting on the rod in a direction to resist inward movement of the rod toward the closure under a handle load. Indeed, the handle load can be made, by careful design of a gas spring embodying the present invention, to remain generally constant over a broad range of temperatures. It will suffice, however, to provide augmentation of the hold-open force (the output force of the gas spring) by means of the bimetallic spring 50 for losses in force on the rod due to reduced gas pressure only below a cut-off point, say 15° C. Above the cut-off temperature, the spring 50 applies no force to the valve member 38, and it remains open. In this case, the gas spring output force alone is the hold-open force that supports the load and the handle load.

Figure 4:
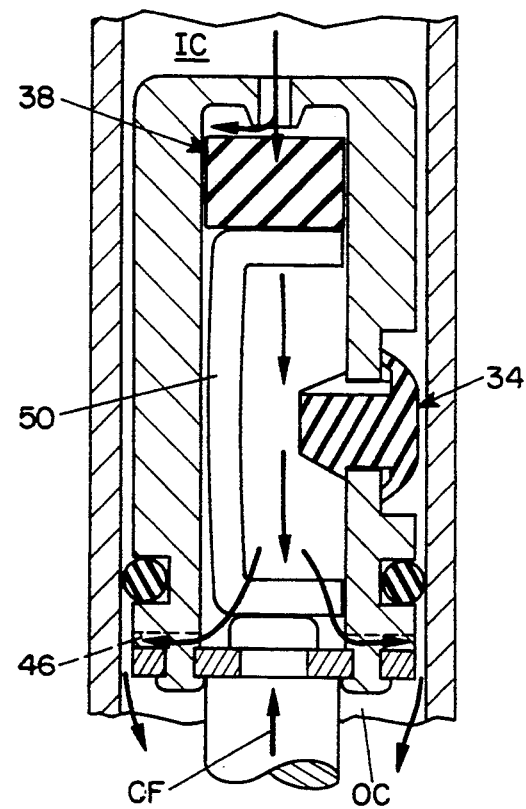

When the second bypass opens, fluid can flow from the inward compartment IC through the valve passage 36, the cavity 40 and the grooves 46 into the outward compartment OC, as shown by the arrows in FIG. 4. Accordingly, the rod 18 and piston 26 can move through the cylinder 12 toward the cylinder end closure 16 under the handle load indicated by the arrow CF in FIG. 4.

Figure 3:
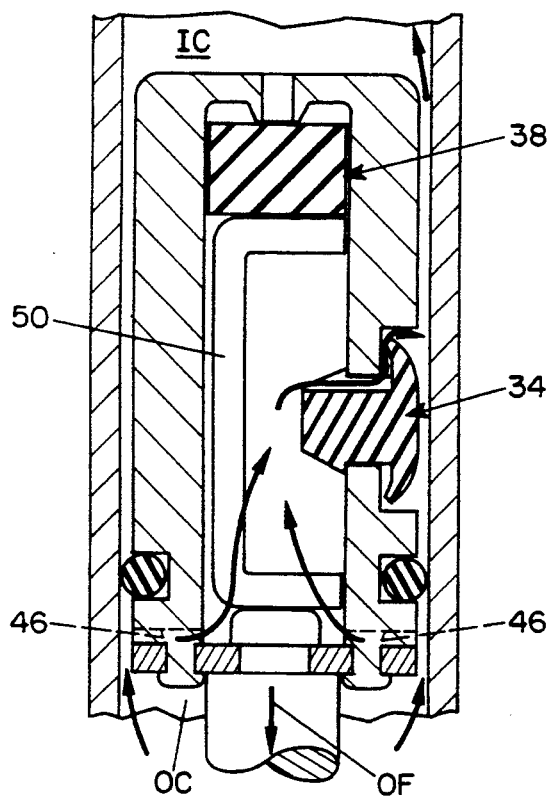

When the load is moved to an open position under the gas spring force, which may or may not be supplemented by a handle force, as indicated by the arrow OF in FIG. 3., the umbrella valve 34 in the passage opens relatively freely and permits fluid to flow from the outward compartment OC through the grooves 46, the cavity 40 and the passage 32 into the inward compartment IC, as indicated by the arrows in FIG. 3. Meanwhile, the second bypass remains closed.

Figure 5:
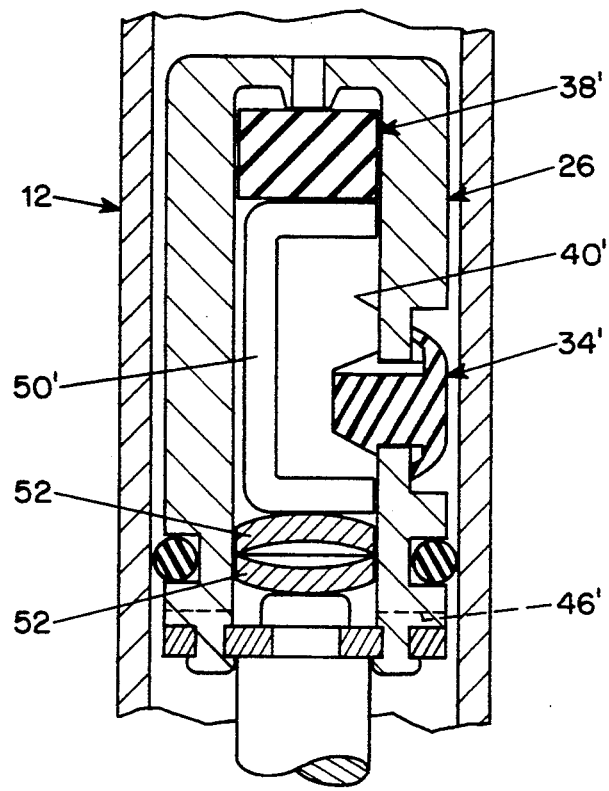
FIG. 5 is an axial cross-sectional view of the piston portion of a second embodiment of the invention.

The embodiment of FIG. 5 is the same in most respects as that of FIGS. 1 to 4. Accordingly, the same reference numerals are applied to FIG. 5, but with a prime (') superscript. To compensate for tolerance variations and to keep the bimetallic spring 50 from rattling when it shrinks at high temperatures, a compression spring, such as a pair of Belleville springs 52, is installed in series with the bimetallic spring in the cavity.

Figure 6:
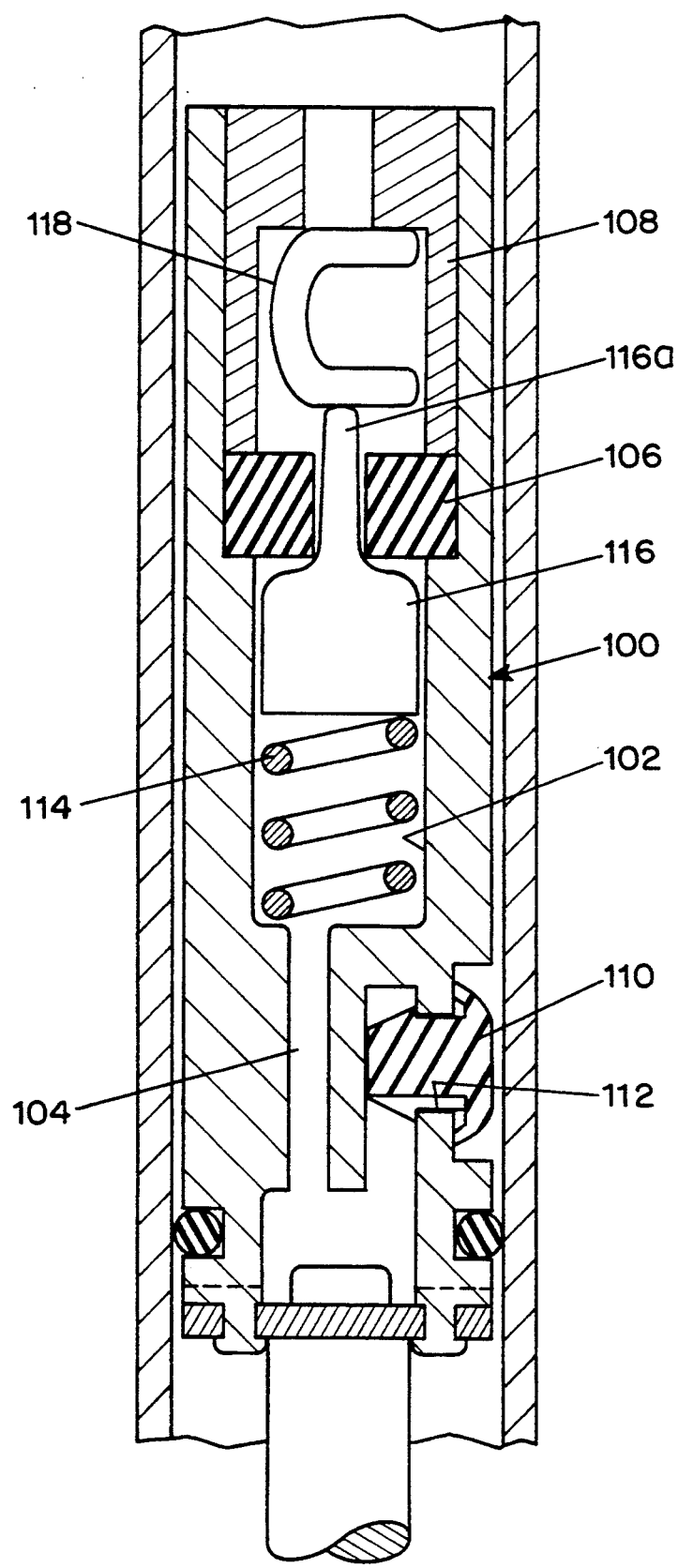
FIG. 6 is an axial cross-sectional view of the piston portion of a third embodiment of the invention.

In the embodiment shown in FIG. 6, a piston 100 having a cavity 102 and an internal passage 104 receives an elastomeric valve seat member 106 that is held in place by a retainer 108 affixed to the piston head. An umbrella valve 110 received in a passage 112 provides a one-way bypass, through which fluid can flow from the outward to the inward compartment when the rod is moving out of the cylinder under the output force of the gas spring. A coil compression spring 114 biases a valve member 116 toward a sealed, closed position in engagement with the valve seat member 106. A bimetallic spring 118 is engaged between a pin portion 116a of the valve member and the spring retainer 108 and opposes the biasing force of the spring 114 with a force that increases as a generally linear function of increases in its temperature. Accordingly, at lower temperatures, it applies relatively low forces to the valve member 116, and the valve is held closed with a relatively high force by the coil spring 114, thereby compensating for the reduced gas spring output force at lower temperatures. As its temperature increases, the bimetallic spring applies increasing forces to the valve member, thereby reducing the net force acting on the valve member and holding it closed and offsetting the increase in the gas spring output force due to the increased temperature.

Numerous variations and modifications of the above-described embodiments can be made by those skilled in the art. For example, the valve in the first bypass may be incorporated into the piston/seal in a manner similar to the embodiment of FIGS. 1 to 3 of U.S. Pat. No. 5,106,065. Also, the rate of fluid flow through the first bypass may be restricted by suitable design of the grooves 46 to retard the speed of movement of the load from closed to open.

We claim:

1. In a gas spring having a cylinder member defining a chamber, a closure at one end of the cylinder member, a piston rod received in sealed relation to the cylinder member at the other end of the cylinder member and movable toward and away from the closure, a piston affixed to the piston rod within the chamber and having sealing means separating the chamber into an inward compartment adjacent said one end of the cylinder and an outward compartment adjacent said other end of the cylinder, the volumes of the compartments varying in accordance with the position of the piston, a mass of a liquid contained in part of the chamber, a mass of gas under a pressure higher than atmospheric pressure contained in the remaining part of the chamber, means on the piston defining a first bypass for allowing the liquid and gas to flow from the outward compartment to the inward compartment when the piston and rod move in the direction of the outward compartment in response to forces imposed on the rod in the outward direction, the first bypass having a one-way valve means for closing the first bypass to prevent flow of gas and liquid therethrough from the inward compartment to the outward compartment when the rod and piston are moved toward the inward compartment, a means on the piston defining a second bypass for permitting the gas and liquid to flow from the inward compartment to the outward compartment upon movement of the rod toward the inward compartment, the second bypass having a spring-biased one-way valve means for preventing flow therethrough in the absence of a predetermined pressure difference between the liquid and gas in the inward and outward compartments, the improvement wherein spring means including a bimetallic temperature-responsive spring is operatively associated with the second bypass valve means such as to impart a biasing force on the second bypass valve means that varies as a function of the temperature of the gas in the chamber, acts in opposition to fluid pressure in the inward compartment, and compensates for variations in the pressure of the gas due to changes in the gas temperature and thereby minimizes variations in the force acting on the rod in a direction to resist movement of the rod toward the inward compartment.

2. The improvement according to claim 1 wherein the second bypass valve means includes a seat and a valve member engageable with the seat in sealed relation, and the bimetallic spring biases the valve member into sealing engagement with the seat with a force that increases as a function of decreases in temperature.

3. The improvement according to claim 2 and further comprising a compression spring engaging the bimetallic spring.

4. The improvement according to claim 1 wherein the second bypass valve means includes a seat and a valve member engageable with the seat in sealed relation, the spring means includes a compression spring biasing the valve member into sealing engagement with the seat member in opposition to fluid pressure in the inward compartment, and the bimetallic spring of the spring means is arranged to oppose the compression spring and impose a force on the valve member in a direction to open it that increases as a function of increases in the temperature of the gas in the chamber.

* * * * *